(12) United States Patent
Raupp Da Rosa et al.

(10) Patent No.: US 10,229,073 B2
(45) Date of Patent: Mar. 12, 2019

(54) SYSTEM-ON-CHIP AND METHOD FOR EXCHANGING DATA BETWEEN COMPUTATION NODES OF SUCH A SYSTEM-ON-CHIP

(71) Applicant: Commissariat a l'energie atomique et aux energies alternatives, Paris (FR)

(72) Inventors: Thiago Raupp Da Rosa, Grenoble (FR); Romain Lemaire, Grenoble (FR); Fabien Clermidy, Saint-Egreve (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 15/448,276

(22) Filed: Mar. 2, 2017

(65) Prior Publication Data
US 2017/0262389 A1 Sep. 14, 2017

(30) Foreign Application Priority Data
Mar. 11, 2016 (FR) ..................... 16 52043

(51) Int. Cl.
*G06F 13/16* (2006.01)
*G06F 13/28* (2006.01)
*G06F 13/40* (2006.01)

(52) U.S. Cl.
CPC .......... *G06F 13/1673* (2013.01); *G06F 13/28* (2013.01); *G06F 13/4068* (2013.01)

(58) Field of Classification Search
CPC ... G06F 13/28; G06F 13/4068; G06F 13/1673
(Continued)

(56) References Cited

U.S. PATENT DOCUMENTS 5,446,915 A * 8/1995 Pierce ................. G06F 9/54
712/11
5,617,537 A * 4/1997 Yamada ............. G06F 15/17
709/201
(Continued)

FOREIGN PATENT DOCUMENTS

EP 1 641 197 A1 3/2006
EP 2 585 931 B1 4/2015

OTHER PUBLICATIONS

French Preliminary Search Report (with Written Opinion) dated Aug. 8, 2016 in French Application 16 52043 filed on Mar. 11, 2016 (with English Translation of Categories of Cited Documents).
(Continued)

*Primary Examiner* — Paul R. Meyers
(74) *Attorney, Agent, or Firm* — Oblon, McClelland, Maier & Neustadt, L.L.P.

(57) ABSTRACT

A system including at least one computation node including a memory, a processor reading/writing data in a work area of the memory and a DMA controller including a receiver receiving data from outside and writing it in a sharing area of the memory or a transmitter reading data in said sharing area and transmitting it outside. A write and read request mechanism is provided in order to cause, upon request of the processor, a data transfer, by the DMA controller, between the sharing area and the work area. The DMA controller includes an additional transmitting/receiving device designed for exchanging data between outside and the work area, without passing through the sharing area.

16 Claims, 4 Drawing Sheets

(58) Field of Classification Search
USPC .......................................................... 710/22
See application file for complete search history.

(56) References Cited

U.S. PATENT DOCUMENTS

| | | | | |
|---|---|---|---|---|
| 6,735,620 | B1* | 5/2004 | Blackmore | G06F 15/17 709/212 |
| 7,774,554 | B2* | 8/2010 | Chaudhary | G06F 12/0862 711/130 |
| 9,756,351 | B2* | 9/2017 | Mody | H04N 19/436 19/436 |
| 2007/0055825 | A1* | 3/2007 | Blumrich | G06F 9/52 711/141 |
| 2008/0066056 | A1* | 3/2008 | Inoue | G06F 11/3644 717/124 |
| 2008/0201532 | A1* | 8/2008 | Chaudhary | G06F 12/0862 711/142 |
| 2009/0006808 | A1* | 1/2009 | Blumrich | G06F 15/17337 712/12 |
| 2009/0007141 | A1 | 1/2009 | Blocksome et al. | |
| 2010/0005199 | A1 | 1/2010 | Gadgil | |
| 2012/0137300 | A1* | 5/2012 | Sakai | G06F 9/5016 718/102 |
| 2012/0185873 | A1* | 7/2012 | Archer | G06F 15/17318 719/313 |
| 2014/0115601 | A1* | 4/2014 | Suzuki | G06F 9/5016 718/104 |
| 2015/0039808 | A1* | 2/2015 | Kaburaki | G06F 12/0246 711/103 |

OTHER PUBLICATIONS

Sang-Il Han, et al., An Efficient Scalable and Flexible Data Transfer Architecture for Multiprocessor SoC with Massive Distributed Memory, DAC, 2004, 6 pgs.

Sumeet S. Kumar, et al., "Low Overhead Message Passing for High Performance Many-Core Processors", IEEE, First International Symposium on Computing and Networking, 2013, 7 pgs.

* cited by examiner

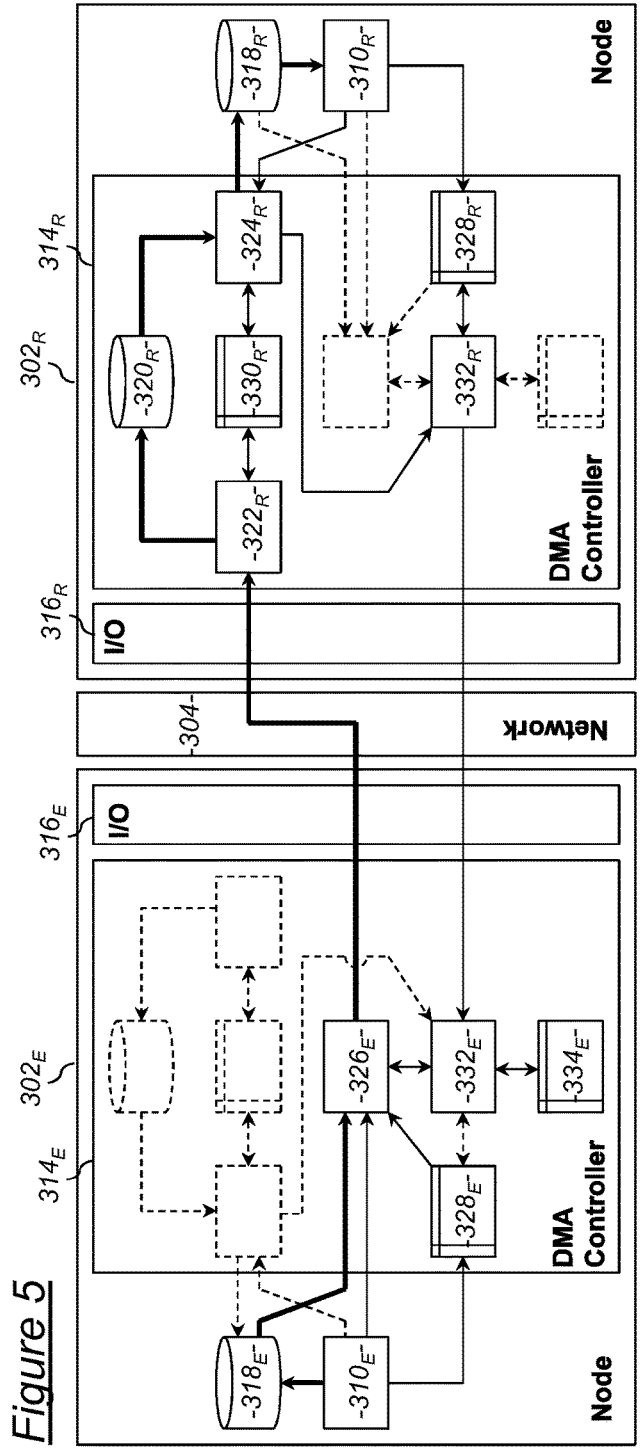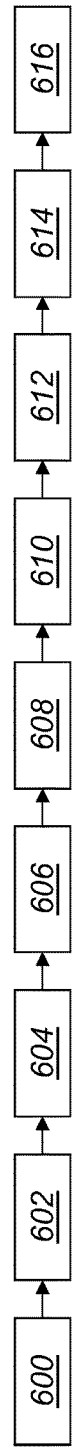
Figure 5
Figure 6

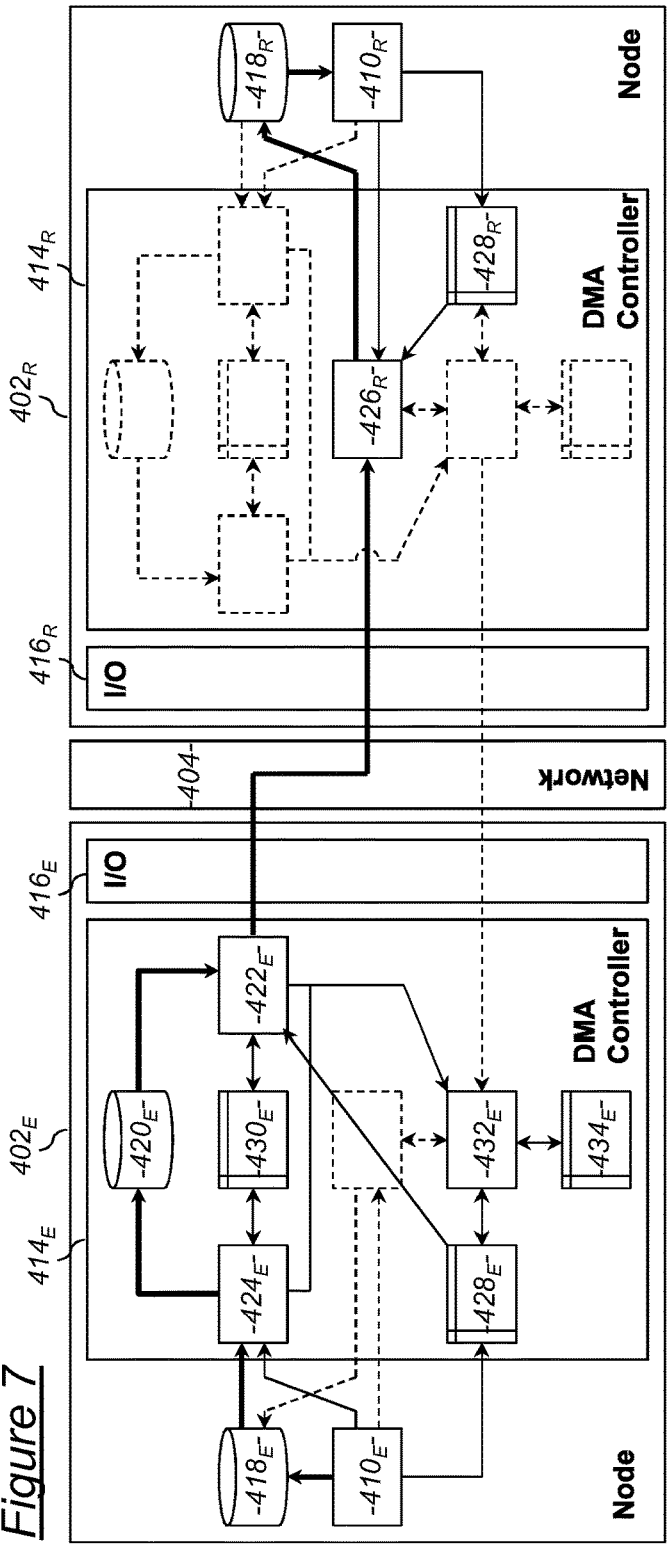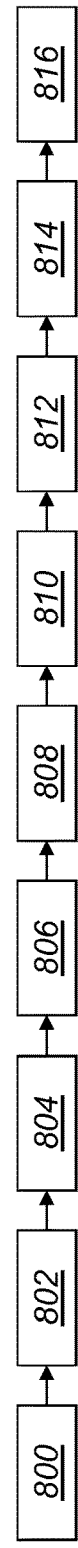

SYSTEM-ON-CHIP AND METHOD FOR EXCHANGING DATA BETWEEN COMPUTATION NODES OF SUCH A SYSTEM-ON-CHIP

The invention relates to a system-on-chip including a plurality of computation nodes interconnected in a network. It also relates to a method for data exchange between computation nodes of such a system-on-chip and a corresponding computer program.

BACKGROUND OF THE INVENTION

In this type of system, communications are generally processed as a data stream. Different processors or processing hardware blocks of different computation nodes perform processing operations on data sequentially transmitted from one processor or processing hardware block to another. By "processing hardware block", we mean a hardware device wherein the processing operations are performed by fixed electronic circuits and not by a processor executing a computer program. The memory and computation resources being distributed, there is no physical link dedicated to each data exchange but a set of processors or processing hardware blocks that share a network communication infrastructure and storage spaces distributed in the network. It therefore involves designing mechanisms and protocols making it possible to optimize the functioning of data exchanges.

In particular, two substantial properties must be taken into consideration when it is sought to optimize communications in such systems:

latency, or the time that passes between the sending of a datum and the receipt thereof, cost, in terms of energy consumption.

The greater the communication latencies are, the more the execution time of an application increases, which has a direct adverse effect on the performance of the system. However, the objective is also to design a system making it possible to reduce the energy expenditure for each data transmission. There is therefore a compromise to be found between performance and energy consumption in the implementation of communication mechanisms and protocols.

DESCRIPTION OF THE PRIOR ART

A first software approach to optimize communications in systems-on-chips is proposed in numerous studies. In processor computation nodes, communications are thus processed entirely by the processors themselves. To simplify the programming, API interfaces (Application Programming Interface) dedicated to communications are proposed. It is possible, for example, to cite the MPI (Message Passing Interface) or MCAPI (Multicore Communications API) API. Although this first approach enables advantageous flexibility, in particular by means of API interfaces with variable granularity and compatible with data stream processing operations, the communication latencies remain high due to software processing operations. Moreover, communications take processing time on the processors, which is detrimental to the computations to be performed by these processors.

A second hardware approach is also proposed in numerous studies. It is generally based on the use of a direct memory access controller in each processor computation node, or a DMA (Direct Memory Access) controller, which makes it possible to provide direct access to the distributed and shared memory without requiring the intervention of a computation node processor. More specifically, the processor concerned by a data exchange is limited to sending a request in order to launch an exchange between a source memory and a destination memory. In "push" mode, the processor commands the DMA controller of its computation node to send data from a local memory to a remote memory. In "pull" mode, the processor commands the DMA controller to receive data from a remote memory in a local memory. Although this second approach enables exchanges and computations to be accelerated, it generally has a number of disadvantages: the need for a processor to configure the local DMA controller for each data exchange and to manipulate the source and destination addresses by means of pointers; no flexibility due to API with variable granularity.

Other hardware and/or software approaches are also proposed, such as, for example, that in the article of Han et al, entitled "An efficient scalable and flexible data transfer architecture for multiprocessor SoC with massive distributed memory", published in Proceedings of the $41^{st}$ annual Design Automation Conference, pages 250-255, Jul. 7-11, 2004. In this article, a hardware approach without DMA controller is proposed: a global distributed memory server is integrated in the network and each computation node is equipped with a predetermined point of access to said global server for any data transfer. But each access point is produced with a local dedicated memory. This represents a cost in terms of logic and reduces flexibility since the allocation of memory resources is fixed and cannot be dependent upon the number of ports necessary for a targeted application. In addition, any data transfer initiated by a processor requires the latter to know the source address as well as the destination address.

The invention applies more specifically to a system-on-chip designed on the basis of the second approach, wherein at least one computation node includes:

at least one memory, at least one data processing processor designed to read data in a work area of said at least one memory, process data read, and write processed data in the work area, and a direct memory access controller including:

a receiver designed to receive data from outside the computation node via the network and to write it in a sharing area of said at least one memory ("pull" mode), or a transmitter designed to read data in the sharing area and transmit it outside the computation node via the network ("push" mode).

Of course, a direct memory access controller of a processor computation node advantageously operates in both "push" and "pull" modes, so that it generally includes, without it being a requirement, a receiver and a transmitter as defined above.

A system-on-chip of this type is, for example, disclosed in the European patent EP 2 585 931 B1. However, the work area of the processor of a computation node is included in the sharing area of the direct memory access controller, so that it is necessary to provide a management of read and write pointers, shared between the processor and the controller, in order to avoid any read or write conflict in the work area. Thus, the processor is not freed of any pointer management and this slows it down in its other tasks.

A solution to this problem is provided in the article of Kumar et al, entitled "Low overhead message passing for high performance many-core processors", published in Proceedings of the $1^{st}$ International Symposium on Computing and Networking (CANDAR), pages 345-351, Dec. 4-6, 2013. This document describes a system of the same type, wherein a hardware interface tool is added to each direct memory access controller of each processor computation node in order to specifically manage the sharing area called MPB ("Message Passing Buffer). An integrated address translation service makes it possible to manage the source and destination addresses independently from one computation node to another. This hardware layer, in addition to the direct memory access controller, frees the processor from the management of write and read pointers in the sharing area without the disadvantages of a software interface. In other words, the MPB sharing area no longer needs to be accessed in read and write mode by the processor and a write and read request mechanism between the direct memory access controller and the processor is implemented so as to cause, upon request of the processor, a data transfer, by the hardware interface tool of the direct memory access controller, between the MPB sharing area and the work area of the processor.

The result of this, however, is that, upon each data transfer between two different computation node processors, two MPB sharing areas should be managed, one on the transmitting node side and the other on the receiving node side. This mechanism, while advantageous in terms of relieving the processor and compatibility with processed data stream communications, in the end increases latency and energy consumption.

It may thus be desirable to provide a system-on-chip that makes it possible to overcome at least some of the problems and constraints mentioned above.

SUMMARY OF THE INVENTION

Therefore, a system-on-chip is proposed, which includes a plurality of computation nodes interconnected in a network, wherein at least one computation node includes:
  at least one memory;
  at least one data processing processor designed to read data in a work area of said at least one memory, process data read and write data processed in said work area;
  a direct memory access controller including:
    a receiver designed to receive data from outside the computation node via the network and to write it in a sharing area of said at least one memory, or
    a transmitter designed to read data in said sharing area and to transmit it outside the computation node via the network;
  wherein a write and read request mechanism is provided between the direct memory access controller and the processor in order to cause, upon request of the processor, a data transfer, by the direct memory access controller, between the sharing area and the work area of said at least one memory; and
  wherein, in addition, the direct memory access controller further includes an additional transmitting or receiving device designed to exchange data between outside the computation node via the network and the work area of the processor, without passing through the sharing area.

Thus, said additional transmitter or receiver in the direct memory access controller makes it possible to short-circuit one of the two sharing areas, on the side of the transmitting node or of the receiving node, when the other of the two sharing areas (respectively on the side of the receiving node or of the transmitting node) is called upon during a data exchange between different computation node processors. It is also possible to envisage calling upon the sharing area of a computation node other than the transmitting and receiving nodes, by short-circuiting the two sharing areas of the transmitting and receiving nodes owing to their additional transmitters/receivers.

Optionally, the direct memory access controller of said at least one computation node includes:
  the receiver designed to receive data from outside the computation node via the network and to write it in the sharing area;
  the transmitter designed to read data in said sharing area and to transmit it outside the computation node via the network; and
  an additional transmitting and receiving device designed to exchange data between outside the computation node via the network and the work area of the processor, without passing through the sharing area.

Also optionally, said at least one memory of said at least one computation node includes:
  a connection table defined so as to associate, for each connection involving one of said at least one processor and established so as to exchange data with another processor or processing hardware block external to said at least one computation node, an identifier of said connection with an identifier of said other external processor or processing hardware block; and
  a sharing table defined so as to associate each connection identifier with a buffer memory area reserved for said connection in the sharing area.

The system is thus capable of managing, in parallel, multiple connections by a computation node in connected mode.

Also optionally:
  the communications between computation nodes are processed as a data stream;
  said at least one memory of said at least one computation node includes a credit table defined so as to associate each connection identifier with a counter of credits available for said connection; and
  the direct memory access controller of said at least one computation node includes a credit manager for updating the credit counter of each connection in progress according to exchanges that take place during said connection.

The system is thus capable of efficiently regulating communications processed in a data stream.

Also optionally, the credit manager is designed to initialize each credit counter according to the size of the buffer memory area reserved for each connection.

Also optionally, at least one of the following elements of said at least one computation node:
  the receiver designed to receive data from outside the computation node via the network and to write it in the sharing area; or
  the transmitter designed to read data in said sharing area and to transmit it outside the computation node via the network; and
  the additional transmitting or receiving device designed to exchange data between outside the computation node via the network and the work area of the processor without passing through the sharing area,
is designed in the form of a hardware block forming a finite-state machine.

The latency is thus further reduced.

Also optionally, the work area of said at least one memory includes a register inside the processor.

Also optionally, the sharing area is configured so as to be inaccessible in read and write modes by the processor.

A data exchange method between a transmitting computation node and a receiving computation node of a system-on-chip comprising a plurality of computation nodes interconnected in a network is also proposed, wherein at least one of the transmitting and receiving computation nodes includes:
- at least one memory;
- at least one data processing processor designed to read data in a work area of said at least one memory, process data read and write processed data in the work area;
- a direct memory access controller including:
  - a receiver designed to receive data from outside the computation node via the network and to write it in a sharing area of said at least one memory, or
  - a transmitter designed to read data in said sharing area and to transmit it outside the computation node via the network;

wherein the method provides a write and read request mechanism between the direct memory access controller and the processor of one and the same computation node in order to cause, upon request of the processor, a data transfer, by the direct memory access controller, between the sharing area and the work area of said at least one memory, and wherein the process further involves, during a data exchange, at least one of said transmitting and receiving computation nodes calling upon an additional transmitting or receiving device of its direct memory access controller in order to exchange data between outside said computation node via the network and the work area of its processor, without passing through its sharing area.

A computer program downloadable from a communication network and/or saved to a computer-readable medium and/or capable of being run by a processor is also proposed, which includes instructions for carrying out the steps of a data exchange method between computation nodes of a system-on-chip according to the invention, when said program is run by a computation node of the system-on-chip.

BRIEF DESCRIPTION OF THE DRAWINGS

The invention will be easier to understand in view of the following description, provided solely as an example and with reference to the appended drawings, wherein:

FIG. 5 shows a data transfer between two computation nodes according to the general structure of FIG. 3, FIG. 6 shows sequential steps of the data transfer of FIG. 5, FIG. 7 shows a data transfer between two computation nodes according to the general structure of FIG. 4, and FIG. 8 shows the sequential steps of the data transfer of FIG. 7.

DESCRIPTION OF THE PREFERRED EMBODIMENTS

Figure 1:
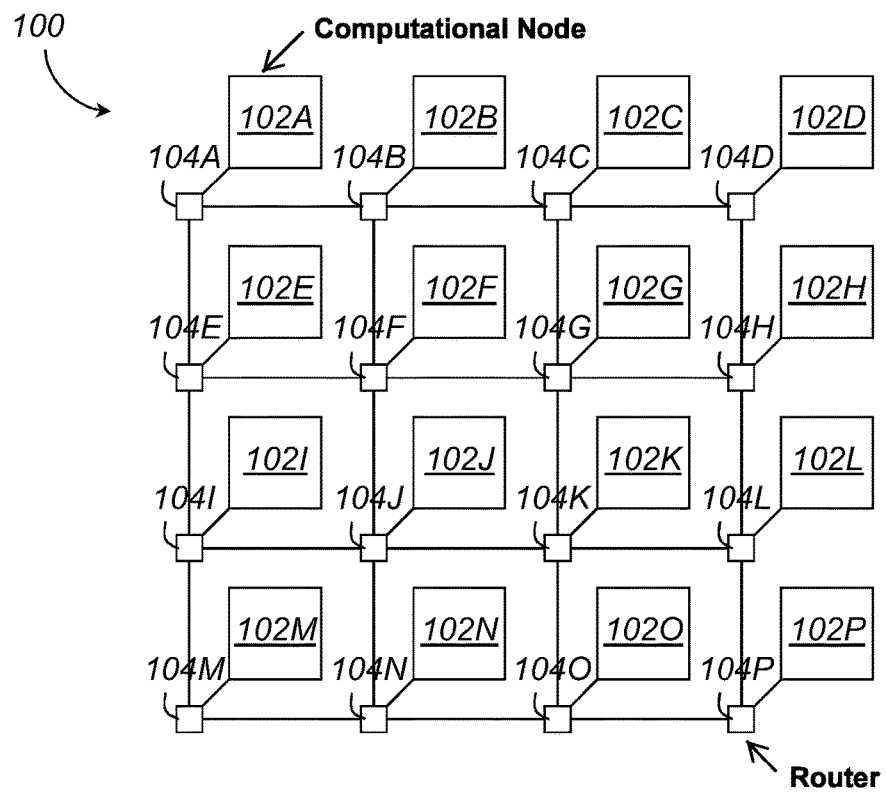
FIG. 1 schematically shows the general structure of an example of a system-on-chip with computation nodes interconnected in a network.

The system-on-chip 100 shown in FIG. 1 includes a plurality of computation nodes 102A, . . . , 102P interconnected in a network by means of routers 104A, . . . , 104P. Said routers 104A, . . . , 104P are connected to one another and each of them is further connected to a respective computation node. Alternatively, and as is generally the case in practice, each router may be connected to a plurality of computation nodes. Thus, data may be exchanged between the computation nodes 102A, . . . , 102P by means of routers 104A, . . . , 104P independently from one exchange to another. This architecture is distributed and particularly suitable for the processing of communications in a data stream.

Each of the computation nodes 102A, 102B, . . . , 102P comprises at least one processor or processing hardware block. Each processor may be generic or specialized in signal processing, the latter case being referred to as a DSP (or Digital Signal Processor). It implements a data processing computer program.

In addition, the system-on-chip 100 may be configured so as to form a processing chain, i.e. a chain of at least some of the computation nodes 102A, . . . , 102P. To this end, each computation node of the desired processing chain is configured so as to transmit the data that it has processed as a data stream to the next computation node(s) in the processing chain. This configuration may be established by one of the processors of one of the computation nodes of the system-on-chip 100.

Figure 2:
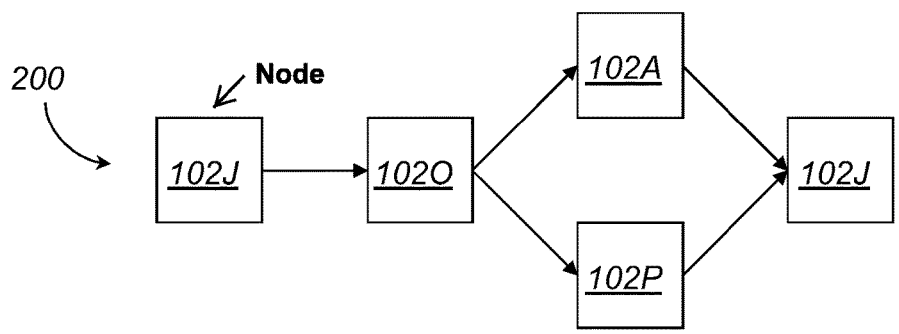
FIG. 2 shows an example of a data processing chain capable of being carried out by the system-on-chip of FIG. 1, FIG. 3 schematically shows the general structure of a computation node of the system-on-chip of FIG. 1, according to a first embodiment of the invention, FIG. 4 schematically shows the general structure of a computation node of the system of FIG. 1, according to a second embodiment of the invention.

A non-limiting example of a processing chain 200 is shown in FIG. 2. In this example, the processing chain 200 consists of the computation node 102J, followed by the computation node 102O, followed by computation nodes 102A and 102P in parallel, the last two being followed by the computation node 102J.

Figure 3:
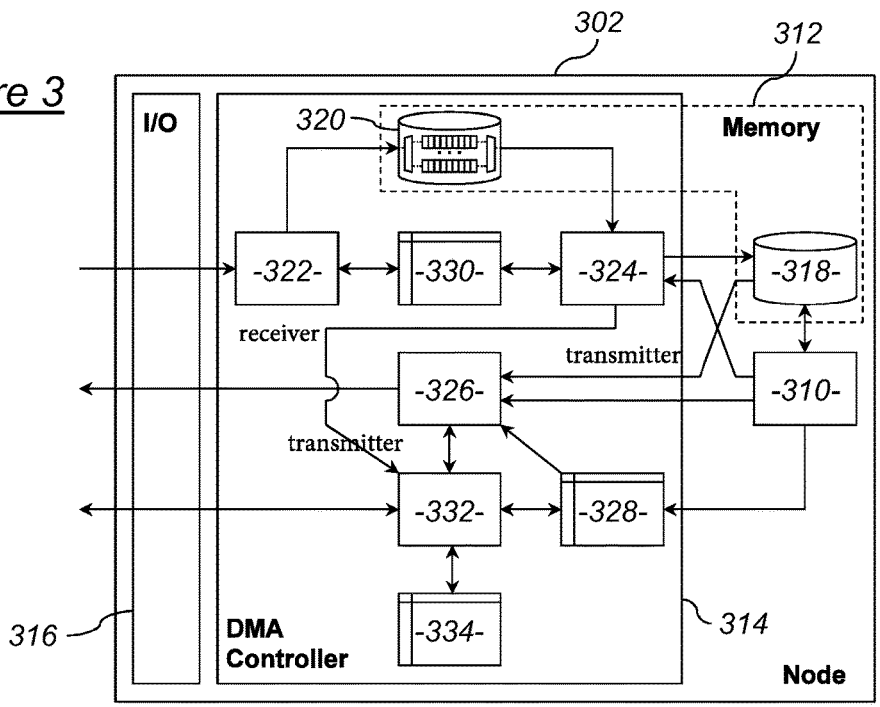

One of the computation nodes of the system-on-chip 100 is schematically shown in FIG. 3, according to a first embodiment of the invention. It is identified by the generic reference 302. It is a processor computation node. This computation node 302 thus includes at least one processor 310 for data processing, at least one memory 312 for storing data, a direct memory access controller 314, called DMA controller 314, and a data input/output interface 316. The system-on-chip 100 includes at least one computation node of this type, with the understanding that all of the computation nodes 102A, . . . , 102P may be of this type.

In the non-limiting embodiment of FIG. 3, a single processor 310 is shown, but there may be a plurality of them in the same computation node 302. In addition, the memory 312 is shown as having a first memory 318, or memory area, called work area, which the processor 310 may access in read and write modes, and a second memory 320, or memory area, called sharing area, which the DMA controller 314 may access in read or write mode. The work area 318 is shown as an autonomous memory outside the processor 310, but it may alternatively consist of a register inside the processor 310. The sharing area 320 is shown as being an internal memory of the DMA controller 314, but it may alternatively be external, autonomous, or combined with the work area 318 in a single memory. In this last configuration, the processor 310 and the DMA controller 314 may have access to said single memory by means of a data transmission bus (not shown). In general, numerous configurations can be envisaged for said at least one memory 312, with the understanding that the only constraints are that the sharing area 320, wherever it is located in the computation node 302, is accessible in read or write mode by the DMA controller 314 and that the work area 318, wherever it is located in the computation node 302, is accessible in read and write modes by the processor 310. It is also possible for the sharing area

320 to be configured so as to be inaccessible in read and write modes by the processor 310.

The processor 310 is more specifically designed to read data in the work area 318, process data read and write processed data in the work area 318. When the work area 318 is an internal register of the processor 310, the data to be processed and processed data is directly received and left available for the DMA controller 314 by the processor 310 in its internal register.

In the non-limiting embodiment of FIG. 3, the DMA controller 314 has a receiver 322 designed to receive data provided by the interface 316, i.e. from outside the computation node 302 via the network, and to write it in the sharing area 320. It further comprises a transmitter 324 designed to read data in the sharing area 320 and to write it in the work area 318. It also includes an additional transmitter 326 designed to read data in the work area 318 and to transmit it to the interface 316, i.e. outside the computation node 302 via the network, without passing through the sharing area 320.

A mechanism for read and write requests between the processor 310 and the DMA controller 314 is also provided in order to cause, upon request of the processor 310, a data transfer, by the DMA controller 314, between the sharing area 320 and the work area 318. More specifically, this mechanism includes a read request mechanism by which the processor 310 addresses a read request to the transmitter 324 so that the latter reads one or more data items in the sharing area 320 and moves it into an identified space of the work area 318. It also comprises a write request mechanism by which the processor 310 addresses a write request to the additional transmitter 326 so that it reads one or more data items identified in the work area 318 and transmits it to a recipient identified outside the computation node 302.

The write and read request mechanism mentioned above works in connected mode, i.e. according to a mode of operation so that each request identifies a connection previously established and configured between the processor 310 and another processor or processing hardware block, for example a processor or processing hardware block of a computation node of the system-on-chip 100 other than node 302. This connection is configured locally for the processor 310 in a correspondence table 328, called a connection table, by means of an LID identifier associated with an RID identifier of the other processor or processing hardware block which participates to the LID connection. More specifically, the RID identifier may comprise both an identifier of the other processor or processing hardware block and a local identifier of the LID connection on the computation node of said other processor or hardware processing block. The LID connection is also identified in another correspondence table 330, called a sharing table, wherein the LID identifier is associated with a buffer memory area defined in the sharing area 320 by a base address @init, a size T of said buffer memory area, an incrementable write pointer PW pointing to a current address from which the receiver 322 must write when it receives one or more data items from outside and an incrementable read pointer PR pointing to a current address from which the transmitter 324 must read when it receives a read request. This buffer memory area functions in a manner known per se as a circular buffer. It should be noted that the connection and sharing tables 328, 330 are shown as being inside the DMA controller 314, but this is not a requirement. They are generally part of the memory space of the computation node 302 identified by reference 312, even if, for the sake of clarity, they have not been shown as being included in this space.

Owing to the LID identifier system, the DMA controller 314 is able to manage multiple connections in parallel and entirely independently of one another, said connections corresponding to a plurality of pairs of type [transmitter; receiver]. For this, it creates as many buffer memory areas as necessary and possible in the sharing area 320.

The write and read request mechanism mentioned above also optionally, but advantageously, works in regulated mode, i.e. according to a mode of operation wherein the communications processed as a data stream are regulated by means of a credit mechanism in order to prevent any buffer memory saturation upon receipt. According to this credit mechanism, a credit manager 332 is implemented in the DMA controller 314. Its operation may generally be consistent with the teaching of patent application EP 1 641 197 A1. More specifically, and in the context of the embodiment of FIG. 3, it works as follows:

in data receiving mode of the computation node 302 in the context of an LID connection, it is advantageously connected for communication with the transmitter 324, itself having access to the sharing table 330, and with access to the data of the connection table 328, in order to be capable of sending credits to the data-transmitting computation node via the interface 316, upon initialization of the connection or during communication, according to the state of the buffer memory area created in the sharing area 320 for the LID connection: size T of said buffer memory area upon initialization and additional credits during communication when data of this buffer memory area is released, in data transmission mode of the computation node 302 in the context of an LID connection, it is advantageously connected for communication with the additional transmitter 326 and with access to the data of a credit table 334, in order to be capable of associating the LID identifier with an available credit counter, said counter being capable of being updated upon each data transmission by the additional transmitter 326 and upon each receipt of new credits via the interface 316.

It should be noted that a threshold mechanism may be implemented in data receiving mode so as to send new credits only when there are a predetermined minimum so as to limit traffic on the network. In data transmission mode, it is understood that the link between the credit manager 332 and the additional transmitter 326 makes it possible to regulate the transmissions of data according to the receiving capacities at each instant without requiring the intervention of an intermediary in the system-on-chip 100.

It should also be noted that the credit table 334 is shown as being inside the DMA controller 314, but this is not a requirement. It is generally part of the memory space of the computation node 302 identified by reference 312, even if, for the sake of clarity, it has not been shown as being included in said space.

Finally, it should be noted that the embodiment described in reference to FIG. 3 makes it possible to call upon the sharing area 320 on the side of the receiving computation node while short-bypassing it on the side of the transmitting computer node during a data exchange between two processors or processing hardware blocks of different computation nodes.

Alternatively, the embodiment which will now be described in reference to FIG. 4 makes it possible to call upon the sharing area on the side of the transmitting computation node while bypassing it on the side of the receiving computation node during a data exchange between two processors or processing hardware blocks of different computation nodes.

Figure 4:
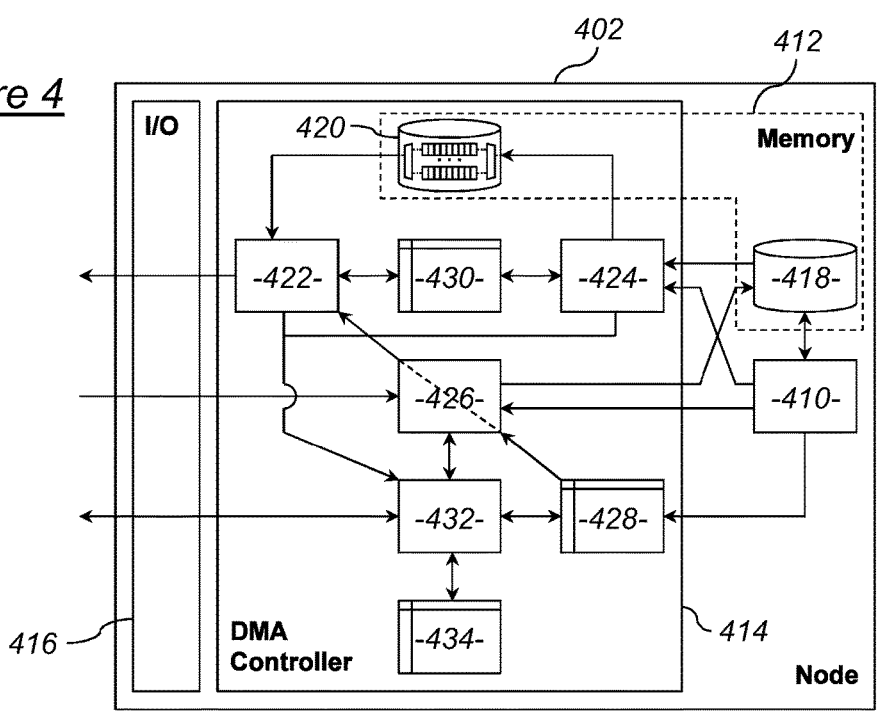

According to this second embodiment, one of the computation nodes of the system-on-chip 100 is schematically identified in FIG. 4 by the generic reference 402. It is also a computation node with a processor. This computation node 402 thus has at least one processor 410 for processing data, at least one memory 412 for storing data, a direct memory access controller 414, called DMA controller 414, and a data input/output interface 416.

As in the embodiment above, and without it being limiting, a single processor 410 is shown and the memory 412 is shown as comprising a first memory 418, or memory area, called work area, which the processor 410 may access in read and write modes, and a second memory 420, or memory area, called sharing area, which the DMA controller 414 may access in read or write mode. It is also possible for the sharing area 420 to be configured so as to be inaccessible in read and write modes by the processor 410.

In the non-limiting embodiment of FIG. 4, the DMA controller 414 includes a transmitter 422 designed to read data in the sharing area 420 and to transmit it to the interface 416, i.e. outside the computation node 402 via the network. It further includes a receiver 424 designed to read data in the work area 418 and to write it in the sharing area 420. It further includes an additional receiver 426 designed to receive data provided by the interface 416, i.e. from outside the computation node 402 via the network, and to write it in the work area 418 without passing through the sharing area 420.

As above, a mechanism for read and write requests between the processor 410 and the DMA controller 414 is also provided in order to cause, upon request of the processor 410, a data transfer, by the DMA controller 414, between the sharing area 420 and the work area 418. More specifically, this mechanism comprises a write request mechanism by which the processor 410 addresses a write request to the receiver 424 so that the latter reads one or more data items identified in the work area 418 and moves it into an identified space of the sharing area 420. It also comprises a read request mechanism by which the processor 410 addresses a read request to the additional the receiver 426 so that it receives one or more data items coming from a transmitter identified outside the computation node 402 and copies it directly into the work area 418 without passing through the sharing area 420.

The write and read request mechanism mentioned above works in connected mode, i.e. according to a mode of operation so that each request identifies a connection previously established and configured between the processor 410 and another processor or processing hardware block, for example a processor or processing hardware block of a computation node of the system-on-chip 100 other than node 402. This connection is configured locally for the processor 410 in a connection table 428, by means of an LID identifier associated with an RID identifier of the other processor or processing hardware block which participates to the LID connection (said RID identifier comprising both an identifier of the other processor or processing hardware block and a local identifier of the LID connection on the computation node of said other processor or hardware processing block). The LID connection is also identified in a sharing table 430 wherein the LID identifier is associated with a buffer memory area defined in the sharing area 420 by a base address @init, a size T of said buffer memory area, an incrementable write pointer PW pointing to a current address from which the receiver 424 must write when it receives a write request and an incrementable PR read pointer pointing to a current address from which the transmitter 422 must read when it must transmit one or more data items outside.

Owing to the LID identifier system, the DMA controller 414 is able to manage multiple connections in parallel corresponding to a plurality of pairs of type [transmitter; receiver]. For this, it creates as many buffer memory areas as necessary in the sharing area 420.

The write and read request mechanism mentioned above also optionally, but advantageously, works in regulated mode. As in the first embodiment, a credit manager 432 may be implemented in the DMA controller 414. Its operation may generally be consistent with the teaching of patent EP 1 641 197 A1. More specifically, and in the context of the embodiment of FIG. 4, it may work as follows:

in data receiving mode of the computation node 402 in the context of an LID connection, it is not called upon, in data transmission mode of the computation node 402 in the context of an LID connection, it may be connected for communication with the transmitter 422 and the receiver 424, themselves having access to the sharing table 430, and with access to the data of a credit table 434, in order to be capable of associating the LID identifier with an available credit counter, said counter being capable of being credited upon initialization of the connection or during communication, according to the state of the buffer memory created in the sharing area 420 for the LID connection, then updated upon each writing of data by the receiver 424 and upon each receipt of new credits if at least some of the buffer memory area is freed up.

As above, a threshold mechanism may be implemented so as to send new credits only when there are a predetermined minimum.

It should be noted, however, that the regulation may also be performed without the assistance of a credit manager in this second embodiment since the sharing area used is on the side of the transmitter. It may therefore, alternatively, be processed locally by a simple conventional management of the sharing area 420 without it being necessary to transmit credits from the receiving node to the transmitting node.

According to a third embodiment not shown, a computation node with processor according to the invention may include the combined functionalities of the first and second embodiments described above. In other words, elements 322 and 422 may be both receiver and transmitter, capable of exchanging between the sharing area 320, 420 and outside the computation node considered; elements 324 and 424 may be both transmitter and receiver, capable of exchanging between the sharing area 320, 420 and the work area 318, 418; finally, elements 326 and 426 may be both additional transmitter and additional receiver, capable of exchanging directly between outside the computation node considered and the work area 318, 418 without passing through the sharing area 320, 420.

This third embodiment of a computation node, optionally combined with the first two embodiments in a system-on-chip 100, makes it possible to call upon the sharing area of an intermediate computation node other than the transmitting and receiving nodes while bypassing it on the side of the transmitting and receiving computation nodes during a data exchange between two processors or processing hardware blocks of different computation nodes.

A data transfer between two computation nodes according to the general structure of the first embodiment of FIG. 3 will now be detailed in reference to FIGS. 5 and 6. According to this structure, it is the sharing area on the side of the receiving computation node that is used, that on the transmitting side being bypassed. FIG. 5 more specifically shows the elements called upon on the side of the transmitting computation node, identified by reference $302_E$, and on the side of the receiving computation node, identified by reference $302_R$, the other elements being represented with dotted lines. The same references as in FIG. 3 are used, with an indication "E" to identify the elements of the transmitting computation node $302_E$ and an indication "R" to identify the elements of the receiving computation node $302_R$. FIG. 6 shows the sequential steps of this data transfer.

In an initialization step 600, a connection is created between the processor $310_E$ of the transmitting computation node $302_E$ and the processor $310_R$ of the receiving computation node $302_R$, for the transmission of data from the work area $318_E$ of the processor $310_E$ to the work area $318_R$ of the processor $310_R$. On the side of the transmitting computation node $302_E$, this connection is identified $LID_E$ and is associated with an identifier $RID_E$ of the processor $310_R$ in the connection table $328_E$. On the side of the receiving computation node $302_R$ this connection is identified $LID_R$ and is associated with an identifier $RID_R$ of the processor $310_E$ in the connection table $328_R$. As seen above, the identifier $RID_E$ may include the identifier $LID_R$ and the identifier $RID_R$ may include the identifier $LID_E$.

In a next step 602 for reserving memory space, the processor $310_R$ sends a request to the transmitter $324_R$ to create a buffer memory area specific to the $LID_R$ connection in the sharing area $320_R$. This buffer memory area is defined and updated in the sharing table $330_R$ by means of an address @init, a size T, a write pointer PW and a read pointer PR.

Then, in a step 604 of sending first credits, the credit manager $332_R$ sends credits to the credit manager $332_E$ for an available credit equivalent of size T. The latter records them in its credit table $334_E$ in relation with the $LID_E$ connection.

In a next step 606, the processor $310_E$ sends a write request to the additional transmitter $326_E$ so that it reads data identified in the work area $318_E$ and transmits it to the work area $318_R$ of the processor $310_R$. This request may be blocking (i.e. the additional transmitter $326_E$ refuses to receive any other request if it has not processed it) or non-blocking (i.e. the additional transmitter $326_E$ places said request in a FIFO memory, for example created for this purpose for the processor $310_E$, and processes the requests of said FIFO memory in the order of arrival).

Different types of requests may be envisaged.

For example, the request may be direct. A write request is described as direct if it includes the data that it wants to send (a memory word, a byte, . . . ) in particular when it comes from a register of the processor $310_E$. The writing is then performed at a fixed address that contains a $LID_E$ field enabling the connection to be identified. In terms of format, a most significant bit may indicate that it is writing, the next bits may indicate the type of request, a "flag" bit may be used to notify the processor $310_E$ once the request has been processed, the other least significant bits identifying the $LID_E$ connection and containing the data.

Also, for example, the request may be indirect. A write request is described as indirect if it does not include the data that it wants to send. The request then includes only an identifier of the memory address, from which the data must be read in the work area $318_E$ and an indication of the size of the data to be read. Again, adequate addressing space makes it possible to identify the connection. In terms of format, a most significant bit may indicate that it is writing, the next bits may indicate the type of request, a "flag" bit may be used to notify the processor $310_E$ once the request has been processed, the other least significant bits identifying the $LID_E$ connection, the memory address from which the data must be read in the work area $318_E$ and the size of the data to be read. It should be noted that the request may be subdivided into two sub-requests, one identifying the memory address from which the data must be read, the other giving the size of the data to be read.

For the effective processing of the request, the additional transmitter $326_E$ interrogates the credit manager $332_E$ in a step 608 to determine whether it has enough credits in the credit table $334_E$ in relation to the $LID_E$ connection. Insofar as there are insufficient credits, the request remains outstanding.

If there are sufficient credits, the method then goes on to a step 610 wherein the credit counter of the credit table of $334_E$ is decremented by a number of credits corresponding to the size of the data concerned by the request. Then, the data is sent by the additional transmitter $326_E$ to the recipient $RID_E$ identified in the connection table $328_E$. In this step, the data passing through the network of the system-on-chip 100, identified by the general reference 304, is received by the interface $316_R$ of the receiving computation node $302_R$, then by the receiver $322_R$.

In a next step 612, the receiver $322_R$ writes the data received in the sharing area $320_R$, more specifically in the buffer memory area associated with the $LID_R$ connection identified in the sharing table $330_R$.

In a step 614, the processor $310_R$ sends a read request to the transmitter $324_R$, this request identifying the $LID_R$ connection in order to read the data received in the sharing area $320_R$ and write it in the work area $318_R$. This step 614 may be initiated independently of the previous steps 606 to 612 but of course can complete its execution only after step 612.

Again, different types of requests may be envisaged.

For example, the request may be direct. A read request is described as direct if it reserves a field for the data that it wants to receive (a memory word, a byte, . . . ), in particular when it is intended to be written by the transmitter $324_R$ directly in a register of the processor $310_R$. The reading is then performed at a fixed address that contains a $LID_E$ field enabling the connection to be identified. The corresponding data is extracted from the buffer memory area of the sharing area $320_R$ by the transmitter $324_R$ and the read pointer PE is consequently incremented. In terms of format, a most significant bit may indicate that it is reading, the next bits may indicate the type of request, a "flag" bit may be used to notify the processor $310_R$ once the request has been processed, the other least significant bits identifying the $LID_E$ connection and reserving space for the data to be read.

Also for example, the request may be indirect. A read request is described as indirect if it does not reserve a field for the data that it wants to receive. The request then includes only an identifier of the memory address from which the data must be written in the work area $318_R$ and an indication of the size of the data expected. Again, adequate addressing space enables the connection to be identified. In terms of format, a most significant bit may indicate that it is reading, the next bits may indicate the type of request, a "flag" bit may be used to notify the processor $310_R$ once the request has been processed, the other least significant bits identifying the $LID_E$ connection, the memory address from which the data must be written in the work area $318_R$ and the size of the data to be written. It should be noted that the request may be subdivided into two sub-requests, one identifying the memory address from which the data must be written, the other giving the size of the data to be written.

Finally, in a step 616, the DMA controller $314_R$ (more specifically its transmitter $324_R$, which then informs the credit manager $332_R$ of it) may free up memory space in the buffer memory area relative to the $LID_R$ connection. The credit manager $332_R$ then transmits (after having consulted the connection table $328_R$) this new credit information to the credit manager $332_E$, which updates its credit table $334_E$. This step may be performed independently of steps 606 to 614.

In accordance with the operation described above for a data transfer, it should be noted that the additional transmitter $326_E$, the receiver $322_R$ and the transmitter $324_R$ called upon may be designed in the form of hardware blocks forming finite-state machines. For example, concerning the additional transmitter $326_E$, it may include a request decoder, a demultiplexer capable of distributing the requests in the dedicated FIFO memories as indicated above, a request selector, the well-known operation of which will not be described in detail, a hardware module for interrogating the credit manager $332_E$, an effective request processing hardware module capable of accessing the connection table $328_E$ and a data recovery hardware module capable of extracting and encapsulating the data to be transmitted. Also for example, concerning the transmitter $324_R$, it may include a request decoder, a demultiplexer capable of distributing the requests in the dedicated FIFO memories, a request selector, a credit updating hardware module, an effective request processing hardware module and a data recovery hardware module capable of extracting the desired data in the sharing area $320_R$ and of writing it into the work area $318_R$.

A data transfer between two computation nodes according to the general structure of the second embodiment of FIG. 4 will now be described in reference to FIGS. 7 and 8. According to this structure, it is the sharing area on the side of the transmitting computation node that is used, while that on the receiving side is bypassed. FIG. 7 shows more specifically the elements called upon on the side of the transmitting computation node, identified by reference $402_E$, and on the side of the receiving computation node, identified by reference $402_R$, the other elements being represented with dotted lines. The same references as in FIG. 4 are used, with an indication "E" to identify the elements of the transmitting computation node $402_E$ and an indication "R" to identify the elements of the receiving computation node $402_R$. FIG. 8 shows the sequential steps of this data transfer.

In an initialization step 800, a connection is created between the processor $410_E$ of the transmitting computation node $402_E$ and the processor $410_R$ of the receiving computation node $402_R$, for the data transmission from the work area $418_E$ of the processor $410_E$ to the work area $418_R$ of the processor $410_R$. On the side of the transmitting computation node $402_E$, this connection is identified as $LID_E$ and is associated with a $RID_E$ identifier of the processor $410_R$ in the connection table $428_E$. On the side of the receiving computation node $402_R$ this connection is identified as $LID_R$ and is associated with a $RID_R$ identifier of the processor $410_E$ in the connection table $428_R$. As seen above, the $RID_E$ identifier may include the $LID_R$ identifier and the $RID_R$ identifier may include the $LID_E$ identifier.

In a next step 802 of reserving memory space, the processor $410_E$ sends a request to the receiver $424_E$ to create a buffer memory area specific to the $LID_E$ connection in the sharing area $420_E$. This buffer memory area is defined and kept up-to-date in the sharing table $430_E$ by means of an address @init, a size T, a write pointer PW and a read pointer PR.

Then, in a step 804 of sending first credits, the credit manager $432_E$ receives credits, for example from the receiver $424_E$, for an available credit equivalent of size T. It records them in its credit table $434_E$ in relation with the $LID_E$ connection.

In a next step 806, the processor $410_E$ sends a write request to the receiver $424_E$ so that it reads the data identified in the work area $418_E$ and transmits it to the work area $418_R$ of the processor $410_R$. This request may be blocking or non-blocking.

As in the embodiment of FIG. 5, the request may be direct or indirect and have the same formalism.

For the effective processing of the request, the receiver $424_E$ interrogates the credit manager $432_E$ in a step 808 to determine whether it has enough credits in the credit table $434_E$ in relation to the $LID_E$ connection. As long as there are insufficient credits, the request remains outstanding.

If there are sufficient credits, the process then goes on to a step 810 wherein the credit counter of the table of $434_E$ is decremented by a number of credits corresponding to the size of the data concerned by the request. Then, the data is read in the work area $418_E$ by the receiver $424_E$ so as to be written in the sharing area $420_E$, more specifically in the buffer memory area associated with the $LID_E$ connection identified in the sharing table $430_E$.

In a step 812, the processor $410_R$ sends a read request to the additional receiver $426_R$, this request identifying the $LID_R$ connection, and therefore the $LID_E$ connection on the transmitting side (owing to the data of the connection table $428_R$), so as to read the desired data in the sharing area $420_E$ and write it in the work area $418_R$. This step 812 may be initiated independently of the previous steps 806 to 810, but of course cannot complete its execution until after step 810.

Again, the request may be direct or indirect and have the same formalism as in the embodiment of FIG. 5.

In a next step 814, the transmitter $422_E$ reads the desired data in the sharing area $420_E$, more specifically in the buffer memory area associated with the $LID_E$ connection identified in the sharing table $430_E$, so as to transmit it to the recipient $RID_E$ identified in the connection table $428_E$. In this step, the data passes through the network of the system-on-chip 100, identified by the general reference 404, is received by the interface $416_R$ of the receiving computation node $402_R$, then by the additional receiver $426_R$ which writes it directly in the work area $418_R$.

Finally, in a step 816, the DMA controller $414_E$ (more specifically its transmitter $422_E$, which then informs the credit manager $432_E$ of it) may free up the memory space in the buffer memory area relative to the $LID_E$ connection and thus deliver corresponding new credits. The credit manager $432_E$ then updates its credit table $434_E$. This step may be performed independently of steps 806 to 814.

According to the operation described above for a data transfer, it should be noted that the receiver $424_E$, the transmitter $422_E$, and the additional receiver $326_R$ called upon may be designed in the form of hardware blocks forming finite-state machines.

It should also be noted that the credit manager $432_E$ is called upon in steps 804, 808, 810 and 816 but that it may easily be replaced by a simple local management of the sharing area $420_E$.

A data transfer between two computation nodes according to the general structure of the third embodiment mentioned above but not illustrated, i.e. a data transfer wherein the sharing area of an intermediate computation node other than the transmitting and receiving nodes may be called upon while bypassing the sharing areas on the side of the transmitting and receiving computation nodes, is derived without any technical difficulty from a combination of the data transfers shown in FIGS. 5 and 7. It therefore will not be described in detail since it is within the abilities of a person skilled in the art.

It should also be noted that the steps of the methods shown in FIGS. 6 and 8 may be implemented by a computer program and be centralized or distributed over one or more processors of the system-on-chip 100.

Finally, the embodiments described above are compatible with a system-on-chip wherein certain computation nodes have processing hardware blocks, for data exchanges between processors of different computation nodes, between processing hardware blocks of different computation nodes or between processors and processing hardware blocks of different computation nodes. In other words, the teaching of the present invention is compatible with the teaching of the patent application EP 1 641 197 A1.

It clearly appears that a system-on-chip as described above makes it possible to achieve high performance in terms of latency and consumption while relieving, as much as possible, the processors of memory access operations. It is furthermore particularly suitable for communication processing in data streams and is compatible with the advantageous teaching of the patent application EP 1 641 197 A1.

It should also be noted that the invention is not limited to the embodiments described above. It in fact appears to a person skilled in the art that various modifications may be made to the embodiments described above, in light of the teaching disclosed. In the claims below, the terms used must not be interpreted as limiting the claims to the embodiments described in the present description, but must be interpreted so as to include all of the equivalents that the claims are intended to cover owing to their wording and which can be carried out by a person skilled in the art applying general knowledge to the implementation of the teaching described above.

The invention claimed is:

1. A system-on-chip, including a plurality of computation nodes interconnected in a network, wherein at least one computation node includes:
    at least one memory;
    at least one data processing processor designed to read data in a work area of said at least one memory, process data read and write data processed in said work area;
    a direct memory access controller including:
        a receiver designed to receive data from outside the computation node via the network and to write it in a sharing area of said at least one memory, and
        an internal transmitter designed to read data in said sharing area and to write it in the work area;
    wherein a read request mechanism is provided between the direct memory access controller and the processor in order to cause, upon request of the processor, a data transfer by the internal transmitter of the direct memory access controller from the sharing area to the work area of said at least one memory;
    wherein the direct memory access controller further includes an additional transmitting device, separate from the transmitter, designed to send data outside the computation node via the network from the work area of the processor, without passing through the sharing area; and
    wherein a write request mechanism is provided between the direct memory access controller and the processor in order to cause, upon request of the processor, a data transfer by the additional transmitting device of the direct memory access controller from the work area of said at least one memory to a recipient identified outside the computation node.

2. The system-on-chip as claimed in claim 1, wherein said at least one memory of said at least one computation node includes:
    a connection table defined so as to associate, for each connection involving one of said at least one processor and established so as to exchange data with another processor or processing hardware block external to said at least one computation node, an identifier of said connection with an identifier of said other external processor or processing hardware block; and
    a sharing table defined so as to associate each connection identifier with a buffer memory area reserved for said connection in the sharing area.

3. The system-on-chip as claimed in claim 1, wherein:
    the communications between computation nodes are processed as a data stream;
    said at least one memory of said at least one computation node includes a credit table defined so as to associate each connection identifier with a counter of credits available for said connection; and
    the direct memory access controller of said at least one computation node includes a credit manager for updating the credit counter of each connection in progress according to exchanges that take place during said connection.

4. The system-on-chip as claimed in claim 2, wherein:
    the communications between computation nodes are processed as a data stream;
    said at least one memory of said at least one computation node includes a credit table defined so as to associate each connection identifier with a counter of credits available for said connection;
    the direct memory access controller of said at least one computation node includes a credit manager for updating the credit counter of each connection in progress according to exchanges that take place during said connection; and
    the credit manager is designed to initialize each credit counter according to the size of the buffer memory area reserved for each connection.

5. The system-on-chip as claimed in claim 1, wherein at least one of the following elements of said at least one computation node:
    the receiver designed to receive data from outside the computation node via the network and to write it in the sharing area; or
    the transmitter designed to read data in said sharing area and to transmit it outside the computation node via the network; and
    the additional transmitting device designed to send data outside the computation node via the network from the work area of the processor without passing through the sharing area, is designed in the form of a hardware block forming a finite-state machine.

6. The system-on-chip as claimed in claim 1, wherein the work area of said at least one memory includes a register inside the processor.

7. A system-on-chip, including a plurality of computation nodes interconnected in a network, wherein at least one computation node includes:

at least one memory;

at least one data processing processor designed to read data in a work area of said at least one memory, process data read and write data processed in said work area;

a direct memory access controller including:
  a receiver designed to receive data from outside the computation node via the network and to write it in a sharing area of said at least one memory, or
  a transmitter designed to read data in said sharing area and to transmit it outside the computation node via the network;

wherein a write and read request mechanism is provided between the direct memory access controller and the processor in order to cause, upon request of the processor, a data transfer by the direct memory access controller between the sharing area and the work area of said at least one memory;

wherein the direct memory access controller further includes an additional transmitting or receiving device designed to exchange data between outside the computation node via the network and the work area of the processor, without passing through the sharing area; and wherein the sharing area is configured so as to be inaccessible in read and write modes by the processor.

8. A data exchange method between a transmitting computation node and a receiving computation node of a system-on-chip including a plurality of computation nodes interconnected in a network, wherein at least one of the transmitting and receiving computation nodes includes:

at least one memory;

at least one data processing processor designed to read data in a work area of said at least one memory, process data read and write processed data in the work area;

a direct memory access controller including:
  a receiver designed to receive data from outside the computation node via the network and to write it in a sharing area of said at least one memory, and
  an internal transmitter designed to read data in said sharing area and to write it in the work area;

wherein the method provides a read request mechanism between the direct memory access controller and the processor of one and the same computation node in order to cause, upon request of the processor, a data transfer, by the internal transmitter of the direct memory access controller, from the sharing area to the work area of said at least one memory; and wherein, during a data exchange, at least one of said transmitting and receiving computation nodes calls upon an additional transmitting device, separate from said receiver and said internal transmitter, of its direct memory access controller in order to send data outside said computation node via the network from the work area of its processor, without passing through the sharing area.

9. A computer program downloadable from a communication network and/or saved to a computer-readable medium and/or capable of being run by a processor, including instructions for carrying out the steps of a data exchange method between computation nodes of a system-on-chip as claimed in claim 8, when said program is run by a computation node of the system-on-chip.

10. A system-on-chip, including a plurality of computation nodes interconnected in a network, wherein at least one computation node includes:

at least one memory;

at least one data processing processor designed to read data in a work area of said at least one memory, process data read and write data processed in said work area;

a direct memory access controller including:
  a transmitter designed to read data in a sharing area of said at least one memory and to transmit it outside the computation node via the network, and
  an internal receiver designed to read data in the work area and to write it in the work area in the sharing area;

wherein a write request mechanism is provided between the direct memory access controller and the processor in order to cause, upon request of the processor, a data transfer by the internal receiver of the direct memory access controller from the work area to the sharing area of said at least one memory;

wherein the direct memory access controller further includes an additional receiving device, separate from the transmitter and the internal receiver, designed to receive data from outside the computation node via the network and to write it in the work area of the processor, without passing through the sharing area; and wherein a read request mechanism is provided between the direct memory access controller and the processor in order to cause, upon request of the processor, a data transfer by the additional receiving device of the direct memory access controller from a transmitter identified outside the computation node to the work area of said at least one memory.

11. The system-on-chip as claimed in claim 10, wherein said at least one memory of said at least one computation node includes:

a connection table defined so as to associate, for each connection involving one of said at least one processor and established so as to exchange data with another processor or processing hardware block external to said at least one computation node, an identifier of said connection with an identifier of said other external processor or processing hardware block; and a sharing table defined so as to associate each connection identifier with a buffer memory area reserved for said connection in the sharing area.

12. The system-on-chip as claimed in claim 10, wherein:

the communications between computation nodes are processed as a data stream;

said at least one memory of said at least one computation node includes a credit table defined so as to associate each connection identifier with a counter of credits available for said connection; and the direct memory access controller of said at least one computation node includes a credit manager for updating the credit counter of each connection in progress according to exchanges that take place during said connection.

13. The system-on-chip as claimed in claim 10, wherein at least one of the following elements of said at least one computation node:

the receiver designed to receive data from outside the computation node via the network and to write it in the sharing area; or the transmitter designed to read data in said sharing area and to transmit it outside the computation node via the network; and the additional receiving device designed to receive data from outside the computation node via the network and write it the work area of the processor without passing through the sharing area, is designed in the form of a hardware block forming a finite-state machine.

14. The system-on-chip as claimed in claim 10, wherein the work area of said at least one memory includes a register inside the processor.

15. A computer program downloadable from a communication network and/or saved to a computer-readable medium and/or capable of being run by a processor, including instructions for carrying out the steps of a data exchange method between computation nodes of a system-on-chip as claimed in claim 11, when said program is run by a computation node of the system-on-chip.

16. A data exchange method between a transmitting computation node and a receiving computation node of a system-on-chip including a plurality of computation nodes interconnected in a network, wherein at least one of the transmitting and receiving computation nodes includes:

at least one memory;

at least one data processing processor designed to read data in a work area of said at least one memory, process data read and write processed data in the work area;

a direct memory access controller including:

a transmitter designed to read data in a sharing area of said at least one memory and to transmit it outside the computation node via the network, and an internal receiver designed to read data in the work area and to write it in the sharing area;

wherein the method provides a write request mechanism between the direct memory access controller and the processor of one and the same computation node in order to cause, upon request of the processor, a data transfer, by the internal receiver of the direct memory access controller, from the work area to the sharing area of said at least one memory; and wherein, during a data exchange, at least one of said transmitting and receiving computation nodes calls upon an additional receiving device of the direct memory access controller, separate from the transmitter and the internal receiver, in order to receive data from outside said computation node via the network and to write it in the work area of the processor, without passing through the sharing area.

\* \* \* \* \*